(12) United States Patent
Coleman et al.

(10) Patent No.: US 8,538,785 B2
(45) Date of Patent: Sep. 17, 2013

(54) SYSTEM AND METHOD FOR COMPUTING AND SCORING THE COMPLEXITY OF A VEHICLE TRIP USING GEO-SPATIAL INFORMATION

(75) Inventors: Mark S. Coleman, Arlington, MA (US); Darrel S. Barbato, Ashland, MA (US); Lihu Huang, Waltham, MA (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 13/213,493

(22) Filed: Aug. 19, 2011

(65) Prior Publication Data

US 2013/0046559 A1 Feb. 21, 2013

(51) Int. Cl.
*G06Q 40/00* (2012.01)
(52) U.S. Cl.
USPC ............................................................ 705/4
(58) Field of Classification Search
USPC ............................................................ 705/4
See application file for complete search history.

(56) References Cited

U.S. PATENT DOCUMENTS

| | | | | |
|---|---|---|---|---|
| 5,797,134 A * | 8/1998 | McMillan et al. | | 705/400 |
| 5,983,158 A * | 11/1999 | Suzuki et al. | | 701/425 |
| 6,064,970 A * | 5/2000 | McMillan et al. | | 705/4 |
| 6,211,798 B1 * | 4/2001 | Albrecht et al. | | 340/990 |
| 6,658,353 B2 * | 12/2003 | Shimizu et al. | | 701/410 |
| 6,868,386 B1 | 3/2005 | Henderson et al. | | |
| 7,821,421 B2 * | 10/2010 | Tamir et al. | | 340/901 |
| 8,090,598 B2 | 1/2012 | Bauer et al. | | |
| 8,140,358 B1 | 3/2012 | Ling et al. | | |
| 8,332,242 B1 * | 12/2012 | Medina, III | | 705/4 |
| 2002/0111725 A1 | 8/2002 | Burge | | |
| 2002/0128882 A1 * | 9/2002 | Nakagawa et al. | | 705/4 |
| 2003/0069761 A1 * | 4/2003 | Nozaki et al. | | 705/4 |
| 2004/0039609 A1 * | 2/2004 | Burkitt | | 705/4 |
| 2004/0153362 A1 * | 8/2004 | Bauer et al. | | 705/10 |
| 2006/0100912 A1 * | 5/2006 | Kumar et al. | | 705/4 |
| 2006/0167784 A1 | 7/2006 | Hoffberg | | |
| 2007/0087756 A1 * | 4/2007 | Hoffberg | | 455/450 |
| 2008/0201227 A1 * | 8/2008 | Bakewell et al. | | 705/14 |
| 2008/0243558 A1 * | 10/2008 | Gupte | | 705/4 |
| 2010/0030582 A1 * | 2/2010 | Rippel et al. | | 705/4 |
| 2010/0063851 A1 * | 3/2010 | Andrist et al. | | 705/4 |
| 2010/0131302 A1 * | 5/2010 | Collopy et al. | | 705/4 |
| 2010/0131304 A1 * | 5/2010 | Collopy et al. | | 705/4 |
| 2010/0228574 A1 * | 9/2010 | Mundinger et al. | | 705/4 |

(Continued)

OTHER PUBLICATIONS

Hiroshi Kuroda, Kazuaki Takano, Nobuyuki Ueki, Hiroshi Kondoh, "Vehicle Control and Information for Safe Driving," 2003, Hitachi Review, vol. 52, No. 1, pp. 63-70.*

(Continued)

*Primary Examiner* — Kenneth Bartley
(74) *Attorney, Agent, or Firm* — Howard IP Law Group, PC (57) ABSTRACT

Systems and methods are disclosed herein for pricing an insurance premium based on route complexity. The system includes a computer memory and a processor in communication with the computer memory. The computer memory stores telematics data received from a sensor within a vehicle. The telematics data includes at least one of geo-position information of the vehicle and vehicle kinematics data. The processor is configured to compute a complexity score of the trip based on the telematics data. The processor is also configured to determine a price for automobile insurance for the driver based on the complexity score of the at least one trip.

28 Claims, 8 Drawing Sheets

(56) References Cited

U.S. PATENT DOCUMENTS

| | | | |
|---|---|---|---|
| 2010/0241465 A1 | 9/2010 | Amigo et al. | |
| 2011/0066454 A1* | 3/2011 | Rosauer et al. | 705/4 |
| 2011/0130906 A1 | 6/2011 | Mayer | |
| 2011/0130916 A1 | 6/2011 | Mayer | |
| 2011/0161116 A1* | 6/2011 | Peak et al. | 705/4 |
| 2011/0213628 A1* | 9/2011 | Peak et al. | 705/4 |
| 2012/0072241 A1 | 3/2012 | Krause et al. | |
| 2012/0089423 A1* | 4/2012 | Tamir et al. | 705/4 |
| 2012/0123806 A1* | 5/2012 | Schumann et al. | 705/4 |
| 2012/0166229 A1* | 6/2012 | Collins et al. | 705/4 |

OTHER PUBLICATIONS

Eric R. Olsen, R. Douglas Ramsey, Davis S. Winn, "A Modified Fractal Dimension as a Measure of Landscape Diversity", Photogrammetric Engineering and Remote Sensing vol. 59, No. 10, pp. 1517-1520, Oct. 1993.

"Complexity." Wikipedia, The Free Encyclopedia. Wikimedia Foundation, Inc.. Apr. 10, 2012. Web.<http://en.wikipedia.org/wiki/Complexity>, pp. 1-9.

"Fractal." Wikipedia, The Free Encyclopedia. Wikimedia Foundation, Inc.. Apr. 23, 2012. Web. <http://en.wikipedia.org/wiki/Fractal>, pp. 1-12.

Jiang Li, Xiao-Yan Wang, Qing-Sheng Guo, "Research on fractal characteristics of urban traffic network structure based on GIS", Chinese Geographical Science, vol. 12, No. 4, 346-349, 2002, DOI: 10.1007/s11769-002-0040-x, <http://www.springerlink.com/content/r5183q602t325606/>.

"Fractal Dimension." Wikipedia, The Free Encyclopedia. Wikimedia Foundation, Inc.. Apr. 14, 2012. Web. <http://en.wikipedia.org/wiki/Fractal_dimension>, pp. 1-8.

James Theiler, "Estimating Fractal Dimension", vol. 7, No. 6, J. Opt. Soc. Am. A, Jun. 1990, pp. 1055-1073.

Junmei Tang, "Evaluating the relationship between urban road pattern and population using fractal geometry", University Consortium for Geographic Information Science, Summer Assembly, Student Paper Sessions, 2003, pp. 1-13.

Stephen Wolfram; The Fractal Dimension of the Blues; from Mathmatica, Teachers Edition; http://reference.wolfram.com/legacy/teachersedition/Teacher/FDB.html; 2002; pp. 1-23.

* cited by examiner

SYSTEM AND METHOD FOR COMPUTING AND SCORING THE COMPLEXITY OF A VEHICLE TRIP USING GEO-SPATIAL INFORMATION

FIELD OF THE INVENTION

In general, the invention relates to a computerized system and method for determining the price of an insurance premium based on the complexity of one or more vehicle trips.

BACKGROUND OF THE INVENTION

The insurance industry has begun exploring the use of telematics sensors and other location-aware devices in motor vehicles as a way of determining driver behavior and, from this, driver risk for the purposes of underwriting, pricing, renewing, and servicing vehicle insurance. The devices can capture very high frequency information on location, speed, vehicle handling, vehicle characteristics, and other factors, which can be used in setting vehicle insurance rates. This rich high frequency data can be used to understand the intricacy or complexity of the specific path a vehicle takes from one destination to another. More complex or intricate routes are subject to a larger proportion of directional changes, accelerations, decelerations, braking, and other driving events that are inherently more risky than driving at a single speed along a straight road. Thus, more complex trips have a higher potential for accidents than less complex trips and should be an important component of evaluating driver risk.

SUMMARY

Therefore, there is a need in the art for an accurate and objective measure of route complexity that is correlated with the likelihood of accidents and losses. Such a measure can be calculated from high frequency location information and/or other vehicle data, such as speed, orientation, and acceleration. Statistical analysis of the high frequency data can be used to classify the complexity of an individual trip or trip segment. One particular statistical measure for quantifying route complexity is the fractal dimension of the route. By analyzing the complexity of many trips, an aggregate driving complexity rating for determining driver risk and an insurance rate can be calculated.

Accordingly, systems and methods are disclosed herein for pricing an insurance premium based on route complexity. The system includes a computer memory and a processor in communication with the computer memory. The computer memory stores telematics data received from a sensor within a vehicle. The telematics data includes at least one of geo-position information of the vehicle and vehicle kinematics data. The processor is configured to compute a complexity score of the trip based on the telematics data. The processor is also configured to determine a price for automobile insurance for the driver based on the complexity score of the at least one trip.

The complexity score can be calculated based on at least one of a fractal dimension of the trip, changes in orientation of the vehicle, speed of the vehicle, acceleration of the vehicle, and jerk of the vehicle. A complexity score of a trip and a maximum speed of a trip can be used to determine a safety score of the trip. An overall complexity rating for a driver can be calculated based on the complexity scores for a plurality of trips taken by the driver. The processor can determine the number of trips to include in the overall complexity rating by analyzing the variation in the complexity scores of the trips taken by the driver over time. In some embodiments, the processor identifies safety events which occurred during the trip and determines a severity estimation of these safety events.

In some embodiments, a retroactive adjustment is applied to the price of an automobile insurance premium for the period during which the telematics data was collected. In other embodiments, a prospective adjustment is applied to a price of an automobile insurance premium for a future period. In some embodiments, determining a price for automobile insurance involves setting a price for a new automobile insurance plan.

According to another aspect, the invention relates to computerized methods for carrying out the functionalities described above. According to another aspect, the invention relates to non-transitory computer readable medium having stored therein instructions for causing a processor to carry out the functionalities described above.

According to another aspect, the invention relates to a computerized method for selecting a trip based on the price of an insurance premium for the trip. The method involves receiving data related to a start point of the trip and the end point of the trip. A processor determines data related to at least two different routes between the start point and the end point. The data includes at least one of geo-position information corresponding to the route and expected vehicle kinematics data expected to occur along the route. The processor then computes a complexity score for each of the routes based on the data related to each of the routes. The processor selects a route that has a lower complexity score than at least one of the other routes. The lower complexity score of the selected route corresponds to an insurance premium that is lower than the insurance premium of the at least one other route.

In some embodiments, the processor outputs the price for the insurance premiums of at least two of the routes. The customer may be able to select to purchase insurance coverage for one of the routes. Rather than selecting a route solely on the insurance premium cost, the processor may select a route that has a lower total trip cost than at least one other route. The total trip cost includes at least the insurance premium price, the cost of fuel, and tolls.

According to another aspect, the invention relates to another system for pricing an insurance premium based on route complexity. The system includes a computer memory and a processor in communication with the computer memory. The computer memory stores telematics data received from a sensor within a vehicle. The telematics data includes at least one of geo-position information of the vehicle and vehicle kinematics data. The processor is configured to retrieve information related to an automobile insurance policy and receive at least a portion of the stored telematics data from the computer memory. The processor computes a complexity score of the trip based on the telematics data and stores the computed complexity score. The processor calculates a price adjustment for a premium for the automobile insurance policy based on the retrieved information related to the policy and the complexity score of the at least one trip, applies the price adjustment to the insurance premium, and outputs the adjusted price for the premium for the automobile insurance policy.

According to another aspect, the invention relates to another system for pricing an insurance premium based on route complexity. The system includes a computer memory for storing information related to an automobile insurance policy and a processor in communication with the computer memory. The processor is configured to receive a fractal complexity score of the trip based on telematics data received from a sensor within a vehicle. The telematics data includes at least one of geo-position information of the vehicle and vehicle kinematics data. The processor determines a price for automobile insurance for the driver based on the fractal complexity score of the at least one trip. The processor stores the price for the automobile insurance in the computer memory.

DESCRIPTION OF CERTAIN ILLUSTRATIVE EMBODIMENTS

To provide an overall understanding of the invention, certain illustrative embodiments will now be described, including systems and methods for computing and scoring the complexity of a vehicle trip using geo-spatial information. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
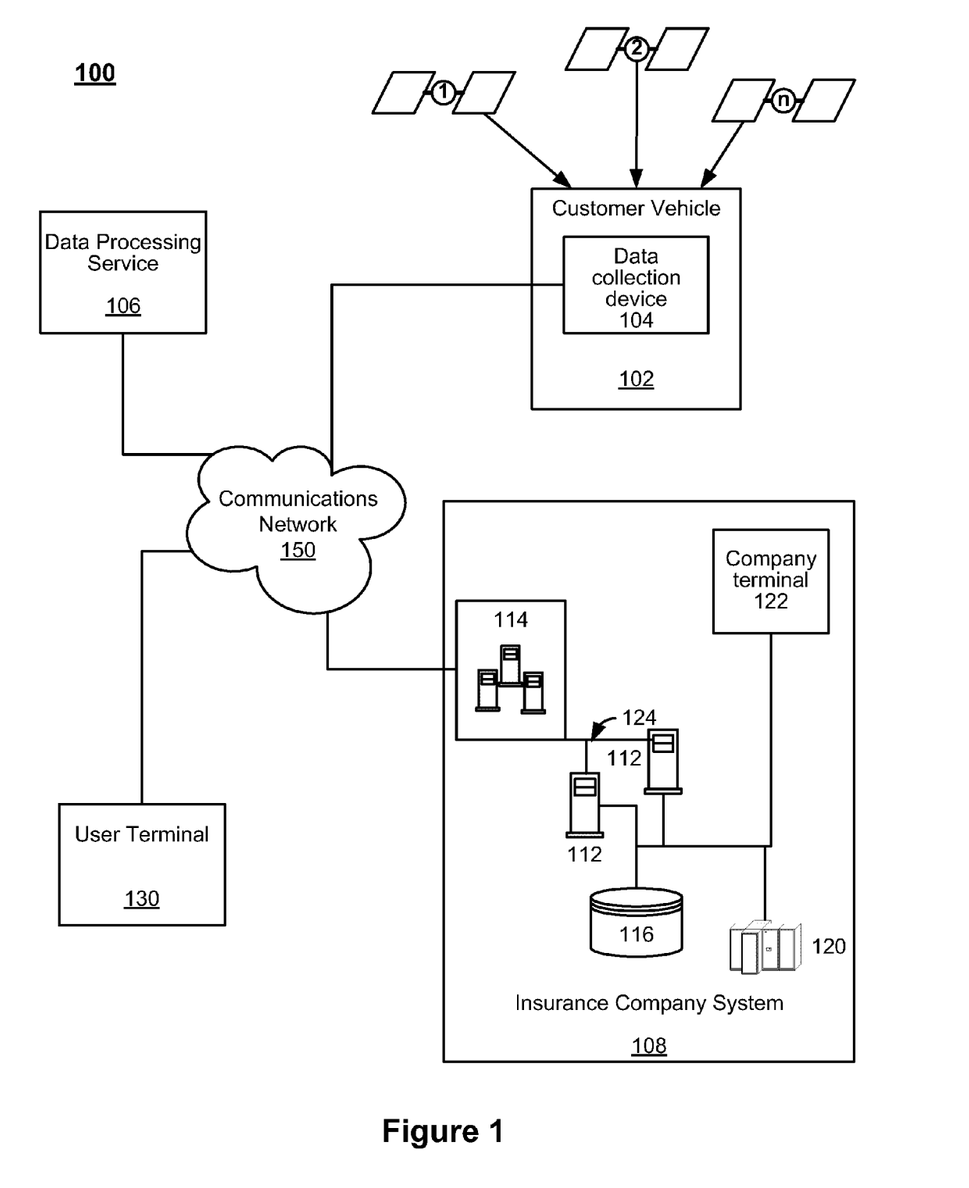
FIG. 1 is an architectural model of a system for setting the price of an insurance premium based on route complexity, according to an illustrative embodiment of the invention.

FIG. 1 is a block diagram of a system 100 for setting the price of an insurance premium based on route complexity, according to an illustrative embodiment. The system 100 uses data collected along one or more routes traveled by a vehicle to determine the complexity of those routes. In general, the more turns, changes in orientation, accelerations, decelerations, changes in speed, etc. that a route has, the more complex it is. For example, a route along a straight highway with little traffic is less complex than a route through the center of a densely trafficked city. An insurance company uses route data, such as global positioning data, acceleration/deceleration data, speed data, and/or vehicle orientation data collected along a route traveled by the vehicle to determine the complexity of the route. With a sufficient amount of data, typically collected over multiple trips, the insurance company can calculate an overall complexity rating describing the complexity of routes taken by the driver and/or the driver's driving habits on the routes. The insurance company can use the complexity rating for setting or adjusting the price of an insurance premium. In some implementations, individual route complexities and/or the drivers' complexity ratings are determined by a third party data processing service. In addition, the insurance premium price may be set by an underwriter, which may be a part of the insurance company or otherwise affiliated with or in a third party arrangement with the insurance company.

The system 100 includes one or more vehicles 102, each having a data collection device 104. The vehicle 102 may be an automobile, motorcycle, truck, bus, watercraft, aircraft, or any other vehicle operated by a driver. A data collection device 104 is coupled to a vehicle 102 for collecting data about the vehicle's location, movements, or other information that can be used to determine route complexity. For vehicles with multiple drivers, the data may be associated with the vehicle itself or with the individual drivers. The data collection device 104 may be positioned inside the vehicle, attached to the outside of the vehicle, or integrated into the vehicle. The data collection device 104 is in communication with an insurance company system 108 over a communication network 150. The data collection device 104 may communicate with the insurance company system 108 though a wireless network such as a cellular network or using a wireless Internet connection. In general, the data collection device 104 can be any computing device or plurality of computing devices in cooperation having a data collection sensor (e.g., an antenna or an accelerometer), a processor, a memory, and a means for transmitting the collected data. The customer vehicle 102 or data collection device 104 may include an antenna for receiving signals from global navigation satellite system (GNSS) satellites, numbered 1 through n in FIG. 1. In one implementation, the data collection device 104 is also configured to process the collected data. In some embodiments, the data processing protects the driver's privacy by encrypting the data, removing location information, producing summary information, or taking other measures to reduce the likelihood that location information, speed information, or other sensitive information are received by the insurance company or third parties.

In some embodiments, rather than sending collected data directly to the insurance company system 108, the data collection device 104 sends collected data to a data processing service 106, which processes the data to determine a route complexity and/or an overall complexity rating for a driver that is then sent to the insurance company system 108 for setting an insurance premium price. This can help protect a driver's privacy, since the insurance company does not get detailed data about a driver's location, but only receives summary information. Using a data processing service 106 is in some implementations also preferable to having the data collection device 104 process data to output a route complexity because it reduces the processing power needed by data collection device 104 and because using a third party data processing service 106 may also make it more difficult for drivers to tamper with the data. The data processing service can perform additional monitoring functions, such as vehicle security monitoring or providing location-based alerts (e.g., alerting a parent or employer when a vehicle goes outside of a specified range) and/or speed alerts.

The insurance company system 108 includes a plurality of application servers 112, a plurality of load balancing proxy servers 114, an insurance company database 116, a processing unit 120, and company terminal 122. These computing devices are connected by a local area network 124.

The application servers 112 are responsible for interacting with the data collection device 104 and/or the data processing service 106. The data exchange between the insurance company system 108 and data collection device 104 and/or data processing service 106 can utilize push and pull technologies where the application servers 112 of the insurance company system 108 can act as both a server and client for pushing data to the data processing service 106 (e.g., which vehicles to monitor, when to stop data collection, rules for monitoring services requested by the customer) and for pulling data from the data processing service 106. The application servers 112 or other servers of the insurance company system 108 can request to receive periodic data feeds from the data collection device 104 and/or data processing service 106. The communication between the application servers 112 and the data processing service 106 can follow various known communication protocols, such as TCP/IP. Alternatively, the application servers 112 and data processing service 106 can communicate with each other wirelessly, e.g., via cellular communication, Wi-Fi, Wi-Max, or other wireless communications technologies or combination of wired or wireless channels. The load balancing proxy servers 114 operate to distribute the load among application servers 112.

The insurance company database 116 stores information about vehicular insurance policies. For each insurance policy, the database 116 includes for example and without limitation, the following data fields: policy coverage, complexity rating, policy limits, deductibles, the agent responsible for the sale or renewal, the date of purchase, dates of subsequent renewals, product and price of product sold, applicable automation services (for example, electronic billing, automatic electronic funds transfers, centralized customer service plan selections, etc.), customer information, customer payment history, or derivations thereof.

The processing unit 120 is configured for determining the price of an insurance premium based on the complexity rating for a driver or vehicle. The processing unit 120 may comprise multiple separate processors, such as a complexity processor, which calculates a complexity rating from raw or processed data from the data collection device 104 or data processing service 106 over the communications network 150; and a business logic processor, which determines a premium price for a policyholder based on, among other things, the complexity rating. In some embodiments, insurance premium prices or information for making insurance pricing determinations may be generated by a third-party underwriter, which is separate from the insurance company system 108. An exemplary implementation of a computing device for use in the processing unit 120 is discussed in greater detail in relation to FIG. 2.

The company terminals 122 provide various user interfaces to insurance company employees to interact with the processing system 120. The interfaces include, without limitation, interfaces to review complexity data, route complexity, and complexity ratings; to retrieve data related to insurance policies; to manually adjust a route complexity or complexity rating; and to manually adjust premium pricing. In some instances, different users may be given different access privileges. For example, marketing employees may only be able to retrieve information on insurance policies but not make any changes to data. Such interfaces may be integrated into one or more websites for managing the insurance company system 108 presented by the application servers 112, or they may be integrated into thin or thick software clients or stand alone software. The company terminals 122 can be any computing devices suitable for carrying out the processes described above, including personal computers, laptop computers, tablet computers, smartphones, servers, and other computing devices.

The user terminal 130 provides various user interfaces to customers to interact with the insurance company system 108 over the communications network 150. Potential customers can use user terminals 130 to retrieve policy and pricing information for insurance policies offered by the insurance company. Customers can enter information pertaining to changes in their insurance policy, e.g., changes in policy coverage, addition or subtraction of drivers, addition or subtraction of vehicles, relocation, mileage information, etc. Customers can also use the user terminal 130 for a pay-as-you-go insurance policy in which customers purchase insurance by the trip or mile. This type of policy is described in relation to FIGS. 8 and 9, and a screenshot from an exemplary web page that a customer with a pay-as-you-go insurance policy can use is show in FIG. 9.

In some embodiments, the data collection device 104 may not be continually connected to the insurance company system 108 via the network 150. For example, the data collection device 104 may be configured to temporarily store data if the data collection device 104 becomes disconnected from the network, like when it travels out of range of cellular towers. When the connection is restored, the data collection device 104 can then transmit the temporarily stored data to the insurance company system 108. The data collection device 104 may alternatively be configured to connect to the communications network 150 through a user's home Wi-Fi network. In this case, the data collection device 104 stores trip data until it returns to the vicinity of the user's home, connects to the user's wireless network, and sends the data. In some embodiments, the data collection device 104 is not connected to the network 150 at all, but rather, data collected is transmitted to the insurance company though other means. For example, a customer can receive a data collection device 104 from the insurance company, couple the device 104 to his car for a set period of time or number of miles, and then either mail the device 104 with the collected data to the insurance company system 108 or extract and send the collected data to the insurance company system 108 via mail, email, or though a website.

Figure 2:
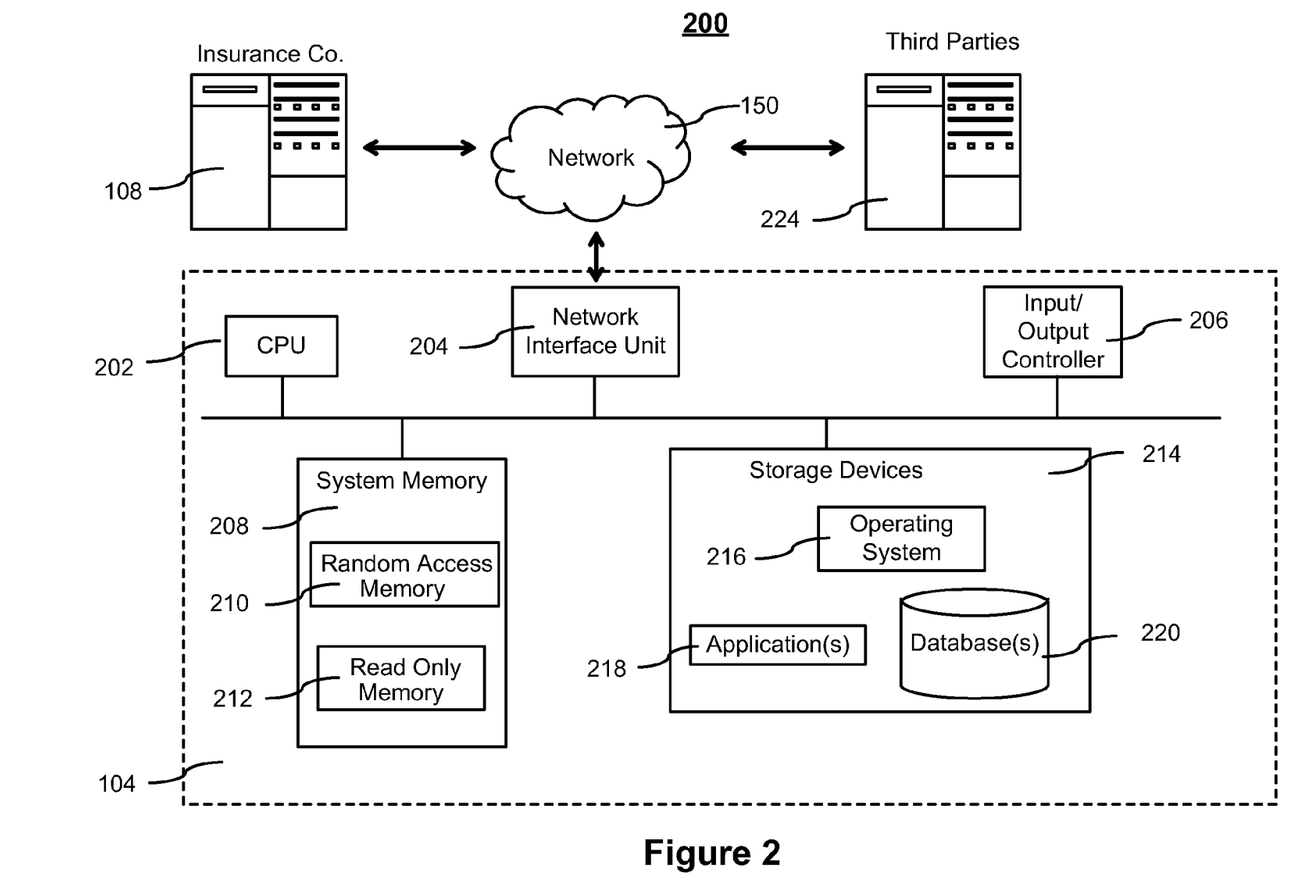
FIG. 2 is a block diagram of a computing system as used in FIG. 1, according to an illustrative embodiment of the invention.

FIG. 2 is a block diagram of a computing device 200 used for carrying out at least one of complexity processing and business logic processing described in relation to FIG. 1, according to an illustrative embodiment of the invention. The computing device comprises at least one network interface unit 204, an input/output controller 206, system memory 208, and one or more data storage devices 214. The system memory 208 includes at least one random access memory (RAM) 210 and at least one read-only memory (ROM) 212. All of these elements are in communication with a central processing unit (CPU) 202 to facilitate the operation of the computing device 200. The computing device 200 may be configured in many different ways. For example, the computing device 200 may be a conventional standalone computer or alternatively, the functions of computing device 200 may be distributed across multiple computer systems and architectures. The computing device 200 may be configured to perform some or all of the complexity and business logic processing, or these functions may be distributed across multiple computer systems and architectures. In the embodiment shown in FIG. 1, the computing device 200 is linked, via network 150 or local network 124 (also described in FIG. 1), to other servers or systems housed by the insurance company system 108, such as the load balancing server 114, and the application servers 112.

The computing device 200 may be configured in a distributed architecture, wherein databases and processors are housed in separate units or locations. The computing device 200 may also be implemented as a server located either on site near the insurance company system 108, or it may be accessed remotely by the insurance company system 108. Some such units perform primary processing functions and contain at a minimum a general controller or a processor 202 and a system memory 208. In such an embodiment, each of these units is attached via the network interface unit 204 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 202 comprises a processor, such as one or more conventional microprocessors and one or more supplementary co-processors such as math co-processors for offloading workload from the CPU 202. The CPU 202 is in communication with the network interface unit 204 and the input/output controller 206, through which the CPU 202 communicates with other devices such as other servers, user terminals, or devices. The network interface unit 204 and/or the input/output controller 206 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 214. The data storage device 214 may comprise an appropriate combination of magnetic, optical and/or semiconductor memory, and may include, for example, RAM, ROM, flash drive, an optical disc such as a compact disc and/or a hard disk or drive. The CPU 202 and the data storage device 214 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 202 may be connected to the data storage device 214 via the network interface unit 204.

The CPU 202 may be configured to perform one or more particular processing functions. For example, the computing device 200 may be configured for calculating a complexity score for a route. The same computing device 200 or another similar computing device may be configured for calculating an aggregate complexity rating based on multiple complexity scores. The same computing device 200 or another similar computing device may be configured for calculating an insurance premium for a vehicle based at least the complexity scores and/or the complexity rating.

The data storage device 214 may store, for example, (i) an operating system 216 for the computing device 200; (ii) one or more applications 218 (e.g., computer program code and/or a computer program product) adapted to direct the CPU 202 in accordance with the present invention, and particularly in accordance with the processes described in detail with regard to the CPU 202; and/or (iii) database(s) 220 adapted to store information that may be utilized to store information required by the program. The database(s) 220 may including all or a subset of data stored in insurance company database 116, described above with respect to FIG. 1, as well as additional data, such as formulas or manual adjustments, used in establishing the insurance risk for a vehicle.

The operating system 216 and/or applications 218 may be stored, for example, in a compressed, an uncompiled and/or an encrypted format, and may include computer program code. The instructions of the program may be read into a main memory of the processor from a computer-readable medium other than the data storage device 214, such as from the ROM 212 or from the RAM 210. While execution of sequences of instructions in the program causes the CPU 202 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for scoring the complexity of a route as described in relation to FIGS. 3-8. The program also may include program elements such as an operating system, a database management system and "device drivers" that allow the processor to interface with computer peripheral devices (e.g., a video display, a keyboard, a computer mouse, etc.) via the input/output controller 206.

The term "computer-readable medium" as used herein refers to any non-transitory medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 202 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3:
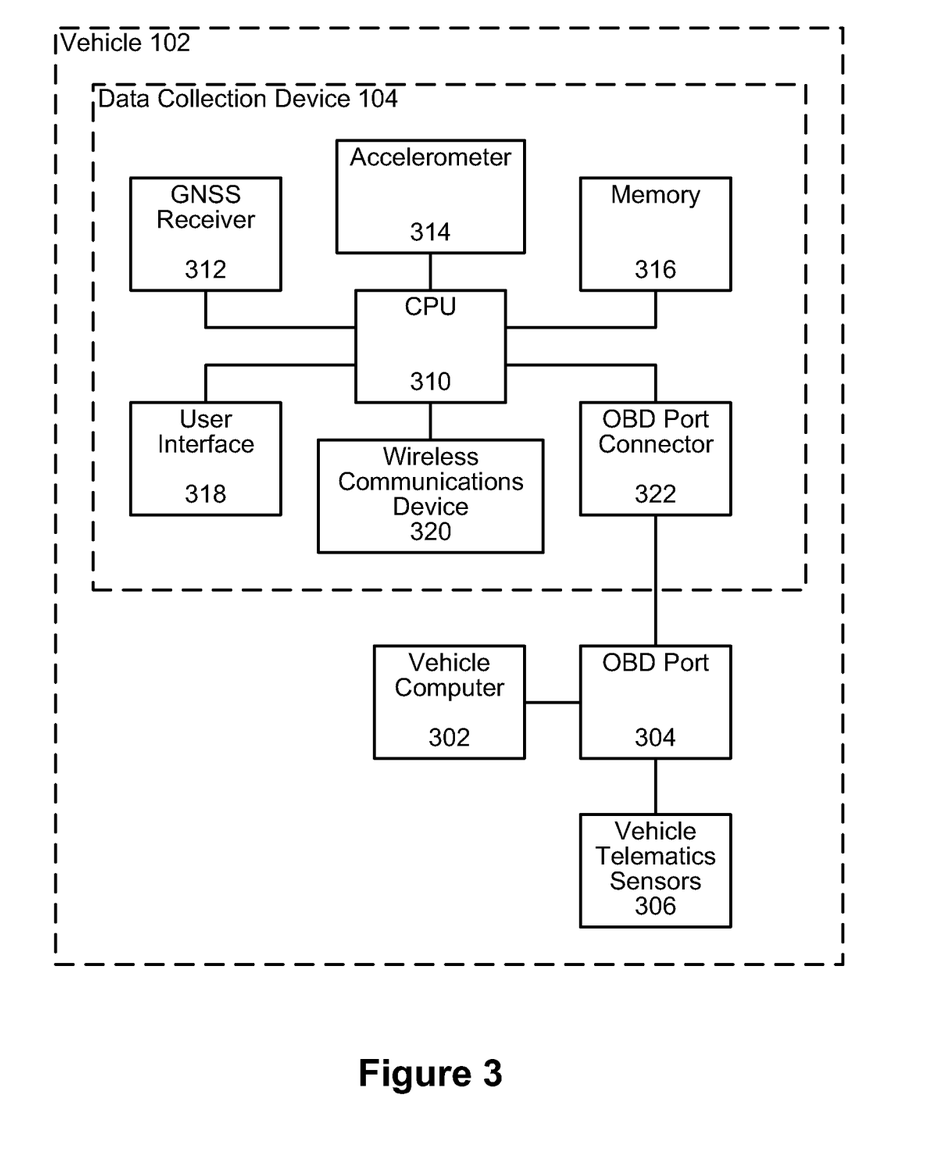
FIG. 3 is a block diagram of a vehicle and a device coupled to the vehicle for collecting data related to route complexity, according to an illustrative embodiment of the invention.

FIG. 3 is a block diagram of a vehicle 102 having a data collection device 104. As described with regard to FIG. 1, the vehicle 102 may be an automobile, motorcycle, truck, bus, watercraft, aircraft, or any other vehicle operated by a driver. The vehicle 102 includes a vehicle computer 302, an on-board diagnostics (OBD) port 304, and vehicle telematics sensors 306. The data collection device 104 is connected to the vehicle 102 via an OBD port connector 322 connected to the OBD port 304 to receive telematics data and other information. The data collection device 104 includes a CPU 310, a GNSS receiver 312, an accelerometer 314, memory 316, a user interface 318, and a wireless communications device 320. The CPU 310 is in communication with the other elements of the data collection device 104 to facilitate the operation of the data collection device 104. The CPU can also be configured to process data received from the GNSS receiver 312, the accelerometer 314, and the OBD port connector 322. Data processing may include calculating route complexities, calculating complexity ratings, calculating intermediate values for determining route complexities, or encrypting data sent by the wireless communications device 320.

The GNSS receiver 312 includes an antenna and associated signal processing circuitry for receiving signals from global navigation satellite system (GNSS) satellites, such as the satellites numbered 1 through n in FIG. 1, and determining its location from the signals. GNSS satellites may be, for example, GPS, GLONASS, Galileo, or Beidou satellites which send time and orbital data from which the data collection device 104 can calculate its location. In some configurations, the CPU 310 calculates the location of the vehicle from data from the receiver 312. The CPU 310 can pull location data from the GNSS receiver 312 at set time intervals, such as every 0.1 seconds, 0.2 seconds, 0.5 seconds, 1 second, 2 seconds, 5 seconds, or 10 seconds. The CPU 310 sends the location data to the memory 316 along with a time and date stamp indicating when the vehicle was at the location. In some embodiments, the GNSS receiver 312 may be part of a separate GNSS device used by the driver for obtaining driving directions. In this case, the GNSS receiver 312 transmits data to the data collection device 104 though a wired connection or a wireless connection, e.g., BLUETOOTH or Wi-Fi.

The accelerometer 314 is a device that measures proper acceleration. Data collected from an accelerometer 314 may include or be used for obtaining the g-force, acceleration, orientation, shock, vibration, jerk, velocity, speed, and/or position of the vehicle. Some or all of these types of data are received or calculated by the CPU 310. The CPU 310 may collect data at intervals such as every 0.1 seconds, 0.2 seconds, 0.5 seconds, 1 second, 2 seconds, 5 seconds, or 10 seconds and store the data in the memory 316. Each data point is time and date stamped and/or location stamped. In some embodiments, the CPU 310 determines intervals between data stored in the memory 316 based on trends in the data. The rate of data collection may vary based on the route complexity; for example, if a driver is travelling along a straight road at a consistent speed, the CPU 310 may save data less frequently than if the driver is making frequent turns. In some embodiments, only "exception data" evident of safety events or other unusual driving behavior is stored. For example, the CPU 310 may only save accelerations, decelerations, hard turns, speeds, lane change speeds, etc. with rates above a certain threshold.

The OBD port connector 322 is used to collect data from the vehicle computer 302 and/or vehicle telematics sensors 306 via OBD port 304. The vehicle computer 302 may provide information about the vehicle's speed, the number of miles traveled, whether the vehicle is running or not, seatbelt usage, airbag deployment, and vehicle diagnostics. Vehicle diagnostics data can be used to determine whether a safety event was caused by the driver's actions or related to a vehicle malfunction, such as low tire pressure, low oil pressure, high engine temperature, loss of power, and stalling. The vehicle may contain additional telematics sensors 306 for, e.g., vehicle tracking, monitoring gasoline consumption, and vehicle safety. Data obtained by the data collection device 104 from the vehicle computer 302 and telematics sensors 306 via the OBD port 304 can supplement or be used instead of data collected by the GNSS receiver 312 and/or accelerometer 314. In some embodiments, the data collection device 104 turns on automatically when the vehicle is turned on; the data collection device 104 may be powered by the vehicle 102.

The data collection device 104 also includes a wireless communications device 320 for sending collected data to and receiving commands from the data processing service 106 and/or insurance company system 108 via the network 150. The data collection device 104 may also be configured for communication with the driver or a passenger via user interface 318. The user interface 318 includes output components, such as a screen or speakers, and input components, such as a touch screen, keyboard, or microphone. The user interface 318 can output complexity data, route summary data, vehicle diagnostics data, and any data collected from the GNSS receiver 312, accelerometer 314, and/or OBD port 304. In some embodiments, the data collection device 104 is also a navigation device that can calculate and display a route to a destination inputted by the user.

Figure 4:
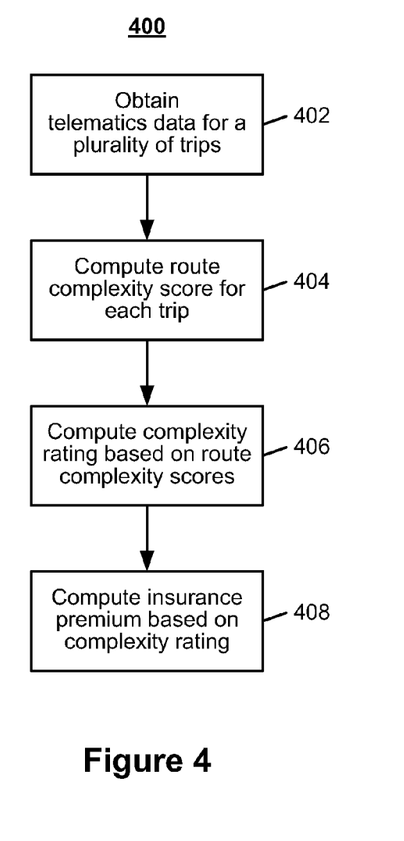
FIG. 4 is a flowchart of a method for determining a complexity rating for a driver and computing an insurance premium based on the complexity rating, according to an illustrative embodiment of the invention.

FIG. 4 is a flowchart of a method 400 for determining a complexity rating for a driver and computing an insurance premium based on the complexity rating. The method 400 includes the steps of obtaining telematics data for multiple trips (step 402), computing a route complexity score for each trip (step 404), calculating a complexity rating based on multiple complexity scores (step 406), and computing an insurance premium based on the complexity rating (step 408). The method 400 can be performed by the data collection device 104, the data processing service 106, the insurance company system 108, or any combination of these.

To obtain telematics data for a trip (step 402), data from receivers and sensors such as GNSS receiver 312, accelerometer 314, vehicle computer 302, and vehicle telematics sensors 306 are collected by the data collection device 104 and stored in the memory 306 of the data collection device 306 and/or sent to the data processing service 106 or insurance company system 108. The telematics data is stored at least by the device or system calculating a complexity rating for each trip (step 404). Data from a plurality of trips is collected since the complexity of a single trip may not be representative of the types or variety of trips travelled by a driver. A driver typically uses his vehicle for different types of trips, such as commuting to work, running errands, recreational trips, long-distance travel, etc., which occur on different routes and at different times of the day, and data from these various trips traveled by the driver should be included when pricing the insurance premium.

Figure 5A:
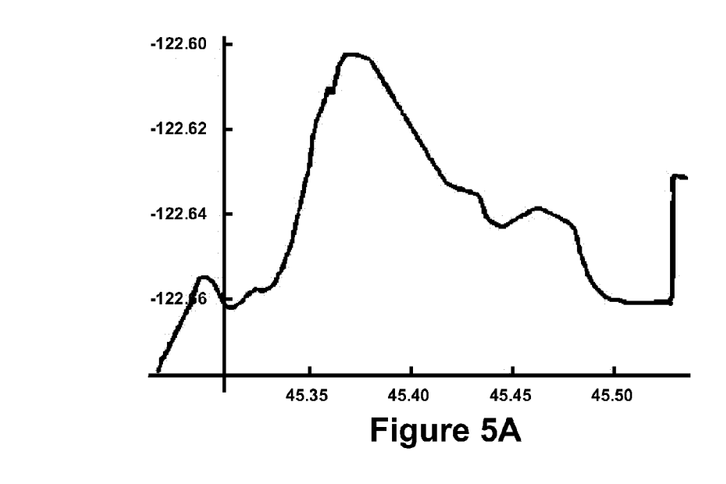
FIG. 5A is a plot of an illustrative route traveled by a vehicle over latitude and longitude.
Figure 5B:
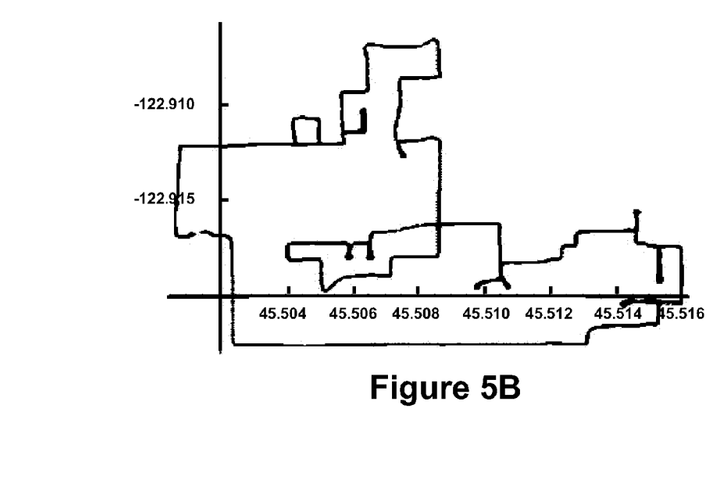
FIG. 5B is a plot of a different illustrative route traveled by a vehicle over latitude and longitude that is more complex than the route of FIG. 5A.

Once data for a trip has been collected, the complexity of the trip is calculated (step 404). One metric for describing the complexity of the trip is fractal dimension. Fractal dimension is a statistical quantity that gives an indication of how completely a fractal appears to fill a space. Fractal dimension for a two dimensional curve ranges from 1 to 2. A straight line has a fractal dimension of 1; a completely filled in two-dimensional space has a fractal dimension of 2. A more complex trip, e.g., a trip having more turns, accelerations, decelerations, changes in speed and orientation, etc. than a less complex trip, has a greater likelihood or average number of safety events. A safety event refers to an occurrence of a sudden change in speed or orientation, which may lead to an accident. A more complex trip also has a higher fractal dimension than a less complex trip. As an example, the fractal dimension can be calculated for a two-dimensional plot of the driver's location over time. FIG. 5A and 5B are plots of two routes over latitude (x-axis) and longitude (y-axis). FIG. 5A has a relatively small number of turns, and many of the turns are smooth. FIG. 5A is representative of a highway or country road. On the other hand, FIG. 5B has many more turns than FIG. 5A, and the turns are sharper. The driver in FIG. 5B appears to making many turns at 90° angles, most likely within a city. One can see by looking at the plots that the route of FIG. 5B is more complex than the route of FIG. 5A, and this is reflected in the fractal dimensions of the routes: the route in FIG. 5A has a fractal dimension of 1.137, and the route in FIG. 5B has a fractal dimension of 1.291.

Figure 6:
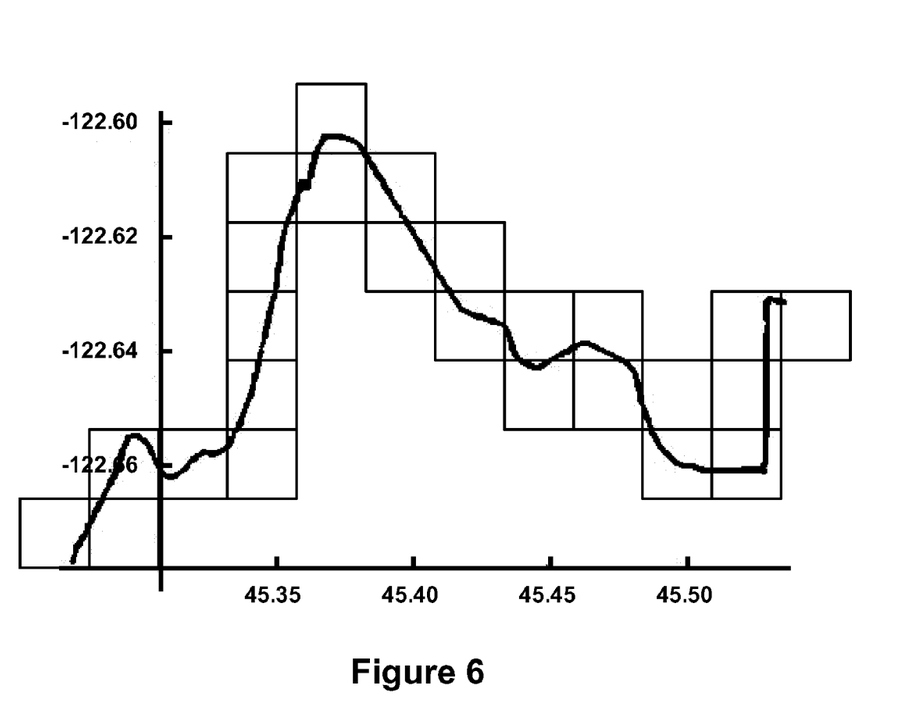
FIG. 6 is a plot of the route of FIG. 5A with boxes imposed over the route for demonstrating an illustrative method for calculating route complexity.

There are many calculation processes for determining the fractal dimension of a route, including box-counting dimension calculation, correlation dimension calculation, and Lyaponuv exponents calculation. Each calculation is performed using a different algorithm, but any of the calculations should return the same or similar fractal dimension for a route. As an example, the box-counting dimension calculation, also called the Minkowski-Bouligand dimension calculation, is illustrated in FIG. 6 for the route of FIG. 5A. A grid can be formed over the path in two dimensions, and boxes are drawn over any square of the grid through which the path travels. The box-counting procedure involves counting the number of boxes that would be required to cover a path. If smaller boxes are drawn, then the number of boxes increases, while the side length of each box shrinks. The box-counting dimension for a route S is defined by comparing the number of boxes N covering the route to the inverse of the side length as the box side length c approaches zero:

$$dim_{box}(S) := \lim_{\varepsilon \to 0} \frac{\log(N(\varepsilon))}{\log(1/\varepsilon)}$$

While FIG. 6 demonstrates a box-counting procedure for a two-dimensional route, the box-counting method and other methods for determining fractal dimension can be used in additional dimensions. The maximum fractal dimension for a curve in N dimensions is N. For example, elevation along a route can be added so that location data is available in three dimensions; in this case, cube-counting can be used to determine fractal dimension, and the fractal dimension is in the range of 1 to 3. Additional data, such as vehicle speed, acceleration, jerk, orientation, etc. can add additional dimensions. While these additional dimensions are harder to visualize, the fractal dimension can similarly be calculated. In other embodiments, multiple different fractal dimensions can be calculated for the different types of data or different combinations of data. More detail about calculating fractal dimension can be found in "Estimating Fractal Dimension" by James Theiler, published in Volume 7, Number 6 of the Journal of the Optical Society of America A (June 1990), the entirety of which is incorporated herein by reference.

Another measure for analyzing the route is lacunarity, which describes how a fractal fills space. Lacunarity is often calculated in conjunction with fractal dimension. Two shapes with the same fractal dimension can have different lacunarities; denser fractals have lower lacunarity, whereas coarser fractals with large gaps or holes have higher lacunarity. In other words, a more heterogeneous path having periods of high complexity and periods of low complexity will have a higher lacunarity than a more homogeneous path of the same fractal dimension and having more moderate complexity. Lacunarity can be calculated using a gliding box method with a box size of r as follows:

$$\mathcal{L}(r) = \frac{\sum_{i=1}^{r^2} S_i^2 Q(S_i, r)}{\left(\sum_{i=1}^{r^2} S_i^2 Q(S_i, r)\right)^2}$$

$S_i$ is the number of filled data points in the box and $Q(S_i, r)$ is the normalized frequency distribution of $S_i$ for different box sizes. More detail about calculating lacunarity and fractal geometries can be found in The Fractal Geometry of Nature by B. B. Mandelbrot (1983), the entirety of which is incorporated herein by reference.

As mentioned previously, vehicle kinematics other than location can be measured and analyzed to determine the complexity of a route. For example, changes in orientation can be used to measure complexity. A higher number of times or a higher frequency with which a driver changes direction is associated with a more complex route with more turns. The road that the driver is on and/or the amount of change in orientation can be used to distinguish between a driver behavior, such as a lane change, and a route characteristic, such a turn from one road onto another road. Other potential complexity measurements include a number or frequency of times a vehicle comes to a full stop along a route or the amount of time the vehicle spends at a full stop, which correlates to the amount of time the driver is at stoplights or stopped in traffic.

In some embodiments, route complexities may be calculated after data has been collected for the plurality of trips. For example, if a driver collects data over a time period which is saved on the data collection device 104 and then either the device itself or the data from the device is sent to the insurance company system 108 or data processing service 106, then the route complexities for all of the trips are calculated at roughly the same time and right before the complexity rating is calculated. In other embodiments, particularly if the data collection device 104 is calculating route complexities or if data is sent to the data processing service 106 or insurance company system 108 continually or at frequent intervals, the route complexity is calculated shortly after the completion of each trip.

Once one or more complexity measurements have been calculated for the plurality of trips, an aggregate complexity rating is calculated (step 406). The aggregate complexity rating can be an average or weighted average of the route complexities. For example, route complexities can be weighted by the distance or time duration of the trip by multiplying the route complexity for a route by the distance or length of the route so that longer trips have a greater weight than shorter trips in the aggregate score. In other embodiments, rather than weighting the trips, the route complexity is calculated at predetermined distance or time intervals. For example, a route complexity can be calculated for each mile traveled or each minute of driving. This also avoids giving too little weight to long trips and too much weight to short trips. If multiple fractal dimensions were calculated for multiple types of data collected, these fractal dimensions can be weighted and combined in the aggregate complexity rating.

An insurance premium for the vehicle is then determined based on the complexity rating (step 408). A vehicle having a higher aggregate complexity rating typically takes more complex routes than a vehicle with a lower complexity rating and, therefore, is more likely to be in an accident. So, a vehicle that typically travels complex routes is offered a higher insurance premium than the same vehicle with the same owner that typically travels less complex routes. Other factors, such as vehicle type, age, value, and storage location and driver age, driving history, residence, and primary driving locations can be used in setting the insurance premium pricing.

Additional telematics data, such as maximum speed, average speed, driving locations, time of day of travel, vehicle safety, etc. can also be used for setting the insurance premium price. The additional data can be combined with the complexity score to form a trip safety score. In some embodiments, the additional data, particularly vehicle kinematics data (i.e., speed, velocity, acceleration, jerk, etc.) is used to gauge how a driver responds to routes. Drivers respond differently to routes, particularly complex routes; for example, some drivers make fast accelerations, decelerations, change lanes, and turns more readily than others who drive more smoothly. The first type of driver experiences more safety events and may be more likely to have an accident than the smoother second type of driver. More severe safety events, e.g., faster or harder accelerations or decelerations, also increase the likelihood that the vehicle will have an accident. So, the frequency of safety events, as well as the type of safety events and severity of the events, can be used in classifying a driver's driving habits and determining the insurance premium.

The complexity rating can be used for retroactive, real-time or prospective insurance premium pricing. A scheme for real-time pricing is described in relation to FIG. 8. For retroactive pricing, a customer can pay a preset price for automobile insurance coverage for a period of time, wherein the preset price assumes a certain complexity rating. During the time period or a portion of the time period, the customer's trips are monitored to determine a complexity rating. At the end of the time period, the customer is given a refund or a credit if the customer's actual complexity rating was lower than the assumed complexity rating of the preset price. In some embodiments, the customer is charged a surcharge if the actual complexity rating was higher than the assumed complexity rating of the preset price. For prospective pricing, the complexities of trips taken by a customer during one time period are used for determining a price for an automobile insurance premium for a different, later time period. For example, a current or prospective customer could install a data collection device in his car for a period of time and send the data collection device to the insurance company or a third party, which calculates the complexity rating to be used for adjusting future premium prices. The customer or the insurance company may request that a new complexity rating be recalculated using new data when the driver's route complexities are more likely change, e.g., if the customer moves, changes jobs, has a child, or retires, or at certain time periods, e.g., every year, every two years, every three years, every five years, every ten years, etc. In some embodiments, both prospective pricing and retroactive pricing are used. For example, a customer being continually monitored can be charged a premium for a time period based on one or more past complexity ratings, and if the customer's actual complexity rating for the time period was greater than or less than the expected rating, a refund, credit, or surcharge may be applied.

Figure 7:
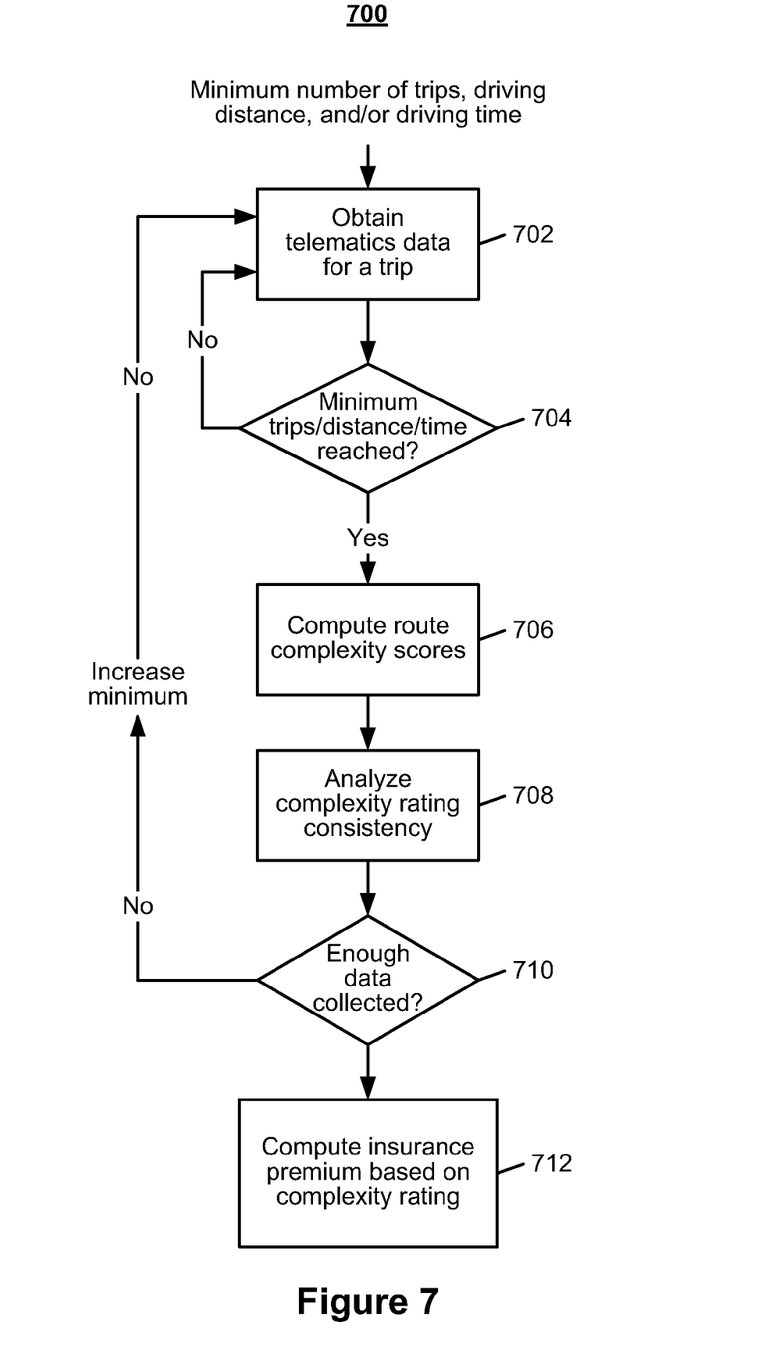
FIG. 7 is a flowchart of a method for determining how much route data to collect and, when data collection is complete, computing an insurance premium based on the route data, according to an illustrative embodiment of the invention.

FIG. 7 is a flowchart of a method 700 for determining how much route complexity data to collect and, when data collection is complete, computing a complexity rating for a driver and computing an insurance premium based on the complexity rating. An adequate number of routes should be traveled by the vehicle so that a complexity rating can be determined that is fairly consistent over time and will accurately describe future trips taken by the vehicle. Furthermore, the data collection device 104 should be installed long enough that it becomes infeasible for the driver to modify his routes or driving habits to fool the insurance company or, if the driver succeeds in modifying his routes or driving habits, new habits form so that the driver drives more smoothly and/or takes less complex routes even in the absence of the data collection device 104. The method 700 is similar to the method 400, but it includes a loop for determining if enough data was collected and collecting additional data if enough data was not collected.

A minimum number of trips, a minimum driving distance, and/or a minimum driving time are determined before beginning data collection. For example, the vehicle must be driven for a certain number of hours, data must be collected over a period of one or more months, the vehicle must be driven a minimum of tens or hundreds or times, or the vehicle must be driven for hundreds or thousands of miles. One or more of these minimums is reached before a complexity rating can be used to price the insurance policy. Once one or more minimums are determined, the data collection device 104 begins obtaining data (step 702). At certain points, such as after each trip, mile, or hour traveled, the data collection device 104, data processing service 106, or insurance company system 108 controlling the data collection device 104 determines whether the minimum(s) have been reached (decision 704). If the minimum(s) have not been reached, data collection continues (step 702). If the minimum(s) have been reached, then route complexity scores are determined (step 706) if they had not already been, and the consistency of the complexity rating is analyzed (step 708) to determine how consistent the complexity rating is over time. Some vehicles may require a fewer number of trips, less time, and less distance to attain a complexity rating that is consistent and can be relied upon for pricing the insurance premium. For example, the geo-spatial route complexity rating for a vehicle that is used solely for commuting to and from work can be characterized with as little as a single trip driving along the commuting route. After a fairly low number of trips, it becomes clear that an adequate number of route samples have been collected. On the other hand, the route complexity for a family car that a parent uses to run errands, drive to school, drive to after school activities, and drive to social engagements would require a greater number of trips to adequately characterize.

The consistency of the complexity rating can be analyzed by observation or computation. The complexity rating can be calculated as a function of time as additional route complexity scores are factored in. For example, at time $t=1$, the complexity rating is the first complexity score; at time $t=2$, the complexity rating is the weighted average of the first two complexity scores; and so forth. Regression analysis can be performed on the complexity rating vs. time data to determine if the time is statistically significant, indicating that the complexity is not stationary in time. In this case, more data should be collected until the complexity rating is stationary in time. So, the minimum amount of data to be collected is increased, and the data collection device 104 collects additional data (step 702). In some embodiments, time series analysis can also be used to describe variation in route complexities over time. In most cases, route complexity is considered to be either stationary in time or cyclostationary, but in some embodiments, time series forecasting can attempt to predict the complexity of future trips.

Once enough data has been collected, the insurance premium is determined (step 712). In analyzing the consistency of the complexity rating, the complexity rating is often calculated, but if the complexity rating has not been calculated, it is calculated before computing the insurance premium. Step 712 is similar to step 408 described above in relation to FIG. 4.

In another embodiment of the invention, the complexity of a route can be analyzed before the route is taken, which allows the insurance company to price individual routes before they are driven. This can be used in a prepaid insurance policy in which a driver can pay for insurance for individual trips. A navigation device, such as the data collection device 104 if configured for providing navigation assistance, can determine a route and output the complexity of a route and the price of insurance for this route to the user. In other implementations, a web interface on a personal computing device, such as a desktop computer, laptop computer, netbook, tablet computer, or smartphone can be used for trip planning. With this information, the user can then decide whether or not to take the route. If the navigation device outputs a complex route with a relatively high premium, the user may decide to take a less complex route with a lower insurance premium. In some embodiments, the user can choose how much coverage to purchase based on the route complexity; for example, the user may purchase additional coverage for a more complex route but less coverage for a less complex route that the driver is more comfortable on.

Figure 8:
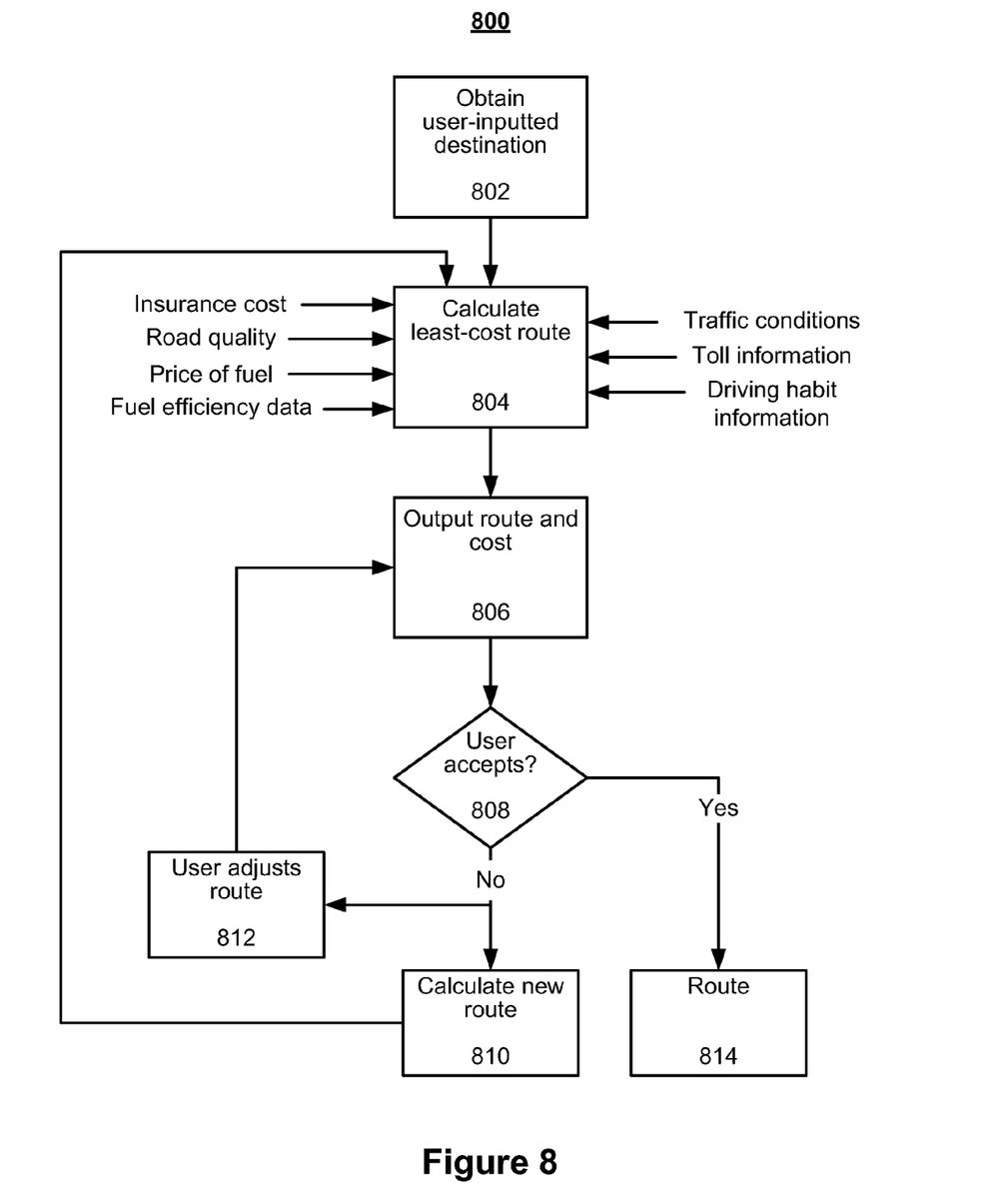
FIG. 8 is a flowchart of a method for determining a complexity rating for a route and setting the price of an insurance premium for a future trip based on the complexity of the route, according to an illustrative embodiment of the invention.

FIG. 8 is a flowchart of a method 800 for use in a prepaid or pay-as-you-go insurance system. The method 800 involves determining a complexity rating for a route and setting the price of an insurance premium for a future trip based on the complexity of the route. The method 800 includes the steps of obtaining a destination from a user (802), calculating the least-cost route (804), outputting the least-cost route and its cost (806), receiving user input (808), and either calculating a different route (810), allowing the user to adjust the route (812), or setting the route (814).

First, the user inputs a desired destination using, for example, a touchpad, keyboard, or microphone. The data collection device 104 can provide search features, autocomplete features, and/or other features used in navigation devices for aiding in destination input. The data collection device 104 then calculates the least cost route to the destination, considering the price of the insurance for the route based on route complexity, the cost of wear and tear to the vehicle due to road quality, the price of fuel (at stations along the route if available), the fuel efficiency of the vehicle, traffic conditions, toll information, and driving habit information. Traffic conditions influence both route complexity and the cost of fuel, as highly trafficked roads require more stopping and starting and greater fuel consumption than less trafficked roads. Driving habit information may also impact both the price of insurance and the fuel efficiency. The route cost also depends on the route length and total fuel consumption, which both depend on several of the aforementioned variables. Various route assignment calculations, such as heuristic approaches, weighted shortest path algorithms (e.g., Dijkstra's algorithm or the Bellman-Ford algorithm), the Frank-Wolfe algorithm, and equilibrium assignment, can be used independently or in conjunction with each other to determine the least-cost route to the destination. Route assignment algorithms compare the cost of a route or the cost of a part of a route to the cost of another route or part of a route. So, the route assignment involves selecting a least or less cost route between two or more alternative routes. In some embodiments, the time to get to the destination is also considered and assigned a cost.

The least-cost route is then outputted to the user along with the cost (step 806), allowing the user to make a decision on the route (decision 808). If the user is not satisfied with the route, he can request a different route, possibly with additional parameters (e.g., no toll roads, no highways, excluding certain roads, avoiding traffic, etc.) or changes to the relative importance of cost, time, and distance (step 810). Then, the method returns to step 804 and a new least-cost route is calculated or the next low-cost route is returned. Alternatively, if the user is not satisfied with the route, he may adjust the route to his liking by, for example, manually dragging the route or part of the route to a different roadway using the touch screen (step 812). After the user has completed manually updating the route, the route and the cost are outputted to the user, who can again decide whether to accept the route or make further adjustments or to calculate a different route. Once the user has adjusted the route to his liking or accepted the route without adjusting it, the data collection device 104 displays the route and/or turn-by-turn to the user (step 814). The data collection device 104 collects data as the vehicle travels along the route. If the driver goes off the path of the route, the insurance premium is recalculated for the new route and the user is alerted. Additionally, data collected along the route can be added to the stored driver habit information for use in pricing future routes. The driver is billed based on the route taken, and may be billed after the user accepts the route or after the driver has reached his destination.

Figure 9:
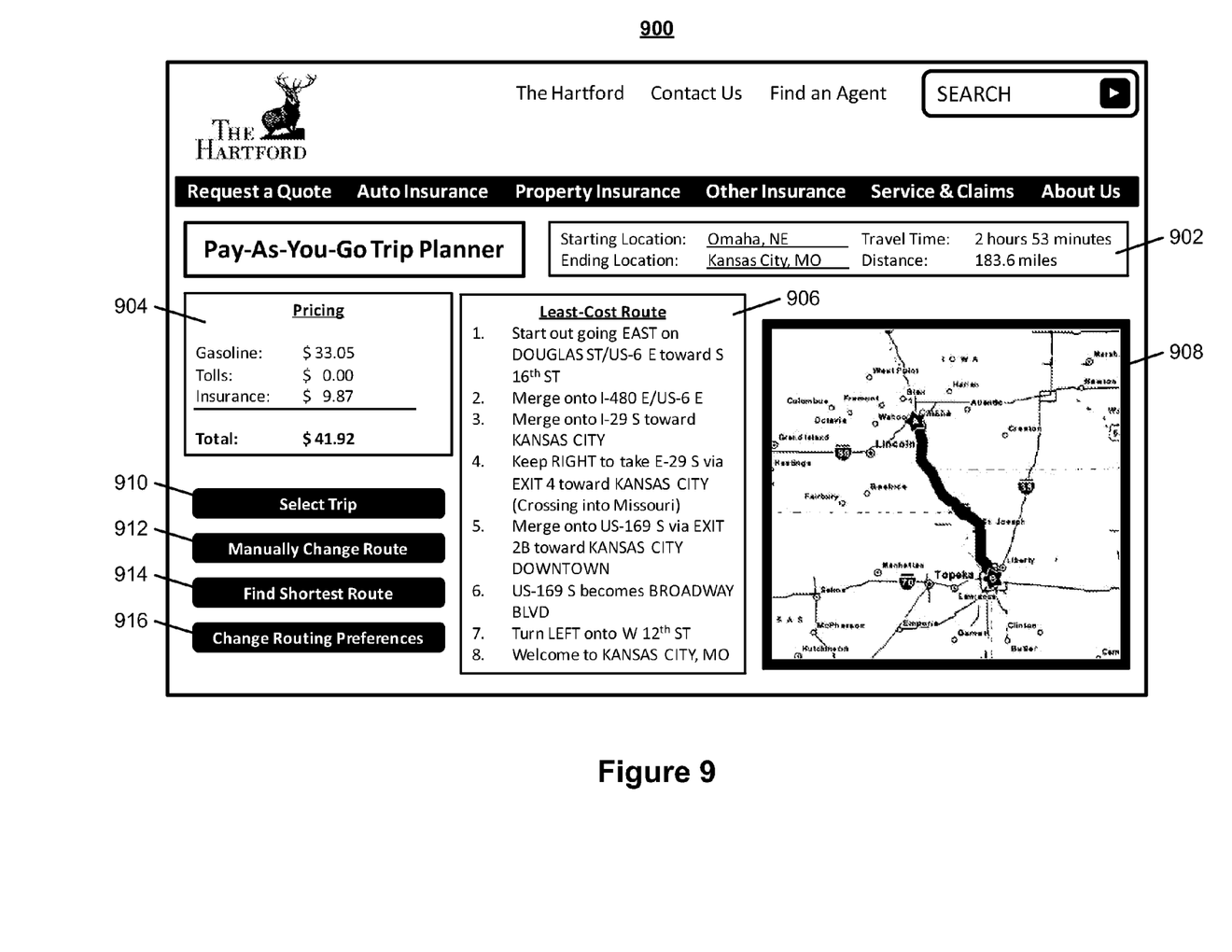
FIG. 9 is a diagram of a graphical user interface for displaying a route between two locations and a price for the route based in part on the complexity of the route, according to an illustrative embodiment of the invention.

FIG. 9 is a diagram of a graphical user interface 900 of a web application for use with a pay-as-you-go insurance policy. The web application can be accessed on a personal computing device, such as the user terminal 130 of FIG. 1, which can be, for example a desktop computer, laptop computer, netbook, tablet computer, or smartphone. In some implementations, the web application can be a stand alone application for a smartphone or tablet computer. The graphical user interface 900 provides route and cost information based on locations determined by a user. In some embodiments, the user signs into an online account for his insurance policy to access the Pay-As-You-Go Trip Planner. Once the user is identified, the web application can access stored account data used for calculating the insurance price, such as policy information, vehicle type, vehicle fuel efficiency, and driving habit information. As with the route selected by the data collection device 104 described in relation to FIG. 8, the route between two points as shown in the graphical user interface 900 is selected for reducing one or more of cost, length, and time.

Box 902 allows the user to input his starting and ending points. In many embodiments, the user will be able to input addresses or points of interest, but as shown, less specific location information, e.g., city and state or zip code, can be entered to get an estimated cost for a trip. Once the user enters both the starting and ending location, the web application calculates a route, e.g. the least cost route, the shortest route, or the fastest route, to the ending location from the starting location. The total expected travel time and distance are output on the right side of box 902.

Box 904 gives the total price and price breakdown of the route. Box 904 includes the price of gasoline, the cost of any tolls along the route, and the cost for insurance, which can be determined as previously described. The total cost is displayed below the price breakdown. Additional costs, such as vehicle wear, may also be included in the price. The least cost route is shown in boxes 906 and 908. Box 906 lists turn-by-turn directions, and box 908 shows a map of the route.

Once the route has been outputted, the user can select the route or make changes to the route using buttons 910-916. To select the trip, the user clicks button 910 ("Select Trip"), which may cause one or more of the following actions: print the route directions and/or map; display printable directions in the graphical user interface 900 or a pop-up window; send the directions to an in-vehicle navigation device, cellular phone, smartphone, or other device that can be used in a vehicle over a wired or wireless connection; and charge the user's payment account. In some implementations, the user's final insurance price for the trip is assessed after the user has completed his trip, as described in relation to FIG. 4. In some implementations, the user can lock a price outputted by the web application with the condition that the user follows the route; if the user does not follow the route, he is charged the insurance price for the route that he actually drove. Locking in the price prevents unforeseen events, such as heavy traffic, that may increase the complexity of the route from impacting the price of the route.

If the user wants to find a different route between the starting and ending locations, he can use buttons 912-916. Button 912 allows the user to manually change the route by, for example, dragging and dropping the route in the map 908. Other buttons may show common routing preferences that were not selected. For example, button 914 ("Find Shortest Route") causes the web application to return the route with the fewest miles, regardless of cost or time. Any other common routing preferences, such as least time, toll avoidance, and lowest cost, can be included as buttons so that the user can see a different route with one click. If the currently displayed route is one of these common routing preferences on a button, that button may not be on the screen or it may be grayed out. Button 916 ("Change Routing Preferences") navigates to another window or opens a second window allowing the user to adjust the routing preferences, such as whether to avoid tolls and whether to minimize cost, time, or miles. The user may want a route with a balance between multiple factors, e.g., low cost and low time. The user can select weights or other indicators of importance of these factors. In some embodiments, the user can input maximums for one or more of cost, time, or miles, preventing the Trip Planner from returning routes that have a cost, expected duration, or length above the threshold. A user's preferred set of options may be stored between uses of the web application and be automatically loaded when the user navigates to the Pay-As-You-Go Trip Planner. In some embodiments, the web application tracks the user's past travel data, including trip complexity data, over time. The application can output this information to the user using, for example, metrics and graphs.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for pricing an insurance premium based on route complexity, the system comprising:
    a computer memory for storing telematics data received from a sensor within a vehicle during at least one trip, the telematics data comprising at least one of geo-position information of the vehicle and vehicle kinematics data; and
    a processor in communication with the memory, wherein the processor is configured for:
        retrieving information related to an automobile insurance policy;
        retrieving at least a portion of the stored telematics data from the computer memory;
        computing a complexity score of the at least one trip based on at least a fractal dimension of a two dimensional representation of a route traversed by the vehicle during the at least one trip derived from the retrieved telematics data;
        storing the computed complexity score;
        calculating a price adjustment for a premium for the automobile insurance policy based on the retrieved information related to the policy and the complexity score of the at least one trip;
        applying the price adjustment to the insurance premium; and
        outputting the adjusted price for the premium for the automobile insurance policy.

2. The system of claim 1, wherein the processor is further configured for calculating complexity score of the trip based on at least one of orientation, speed, acceleration, and jerk of the vehicle.

3. The system of claim 1, wherein the processor is further configured for determining an overall complexity rating for a driver based on complexity scores calculated for a plurality of trips taken by the driver.

4. The system of claim 1, wherein the processor is further configured for identifying safety events which occurred during the trip and determining, by the processor, a severity estimation of the safety events.

5. A system for pricing an insurance premium based on route complexity, the system comprising:
    a computer memory for storing telematics data received from a sensor within a vehicle during at least one trip taken by the vehicle while driven by a driver, the telematics data comprising at least one of geo-position information of the vehicle and vehicle kinematics data; and
    a processor in communication with the memory, wherein the processor is configured for:
        computing a complexity score of the at least one trip based on at least a fractal dimension of a two dimensional representation of a route traversed by the vehicle during the at least one trip derived from the telematics data received from the computer memory; and
        determining a price for automobile insurance for the driver based on the complexity score of the at least one trip.

6. The system of claim 5, wherein the processor is further configured for calculating complexity score of the trip based on changes in orientation of the vehicle.

7. The system of claim 5, wherein the processor is further configured for calculating the complexity score of the trip based on at least one of speed, acceleration, and jerk of the vehicle.

8. The system of claim 5, wherein the processor is further configured for determining an overall complexity rating for a driver based on complexity scores calculated for a plurality of trips taken by the driver.

9. The system of claim 8, wherein the processor is further configured for determining a number of trips to be included in the overall complexity rating by analyzing a variation in the complexity scores over time.

10. The system of claim 5, wherein the processor is further configured for determining a trip safety score based on a complexity score and a maximum speed for the trip.

11. The system of claim 5, wherein the processor is further configured for identifying safety events which occurred during the trip and determining, by the processor, a severity estimation of the safety events.

12. The system of claim 5, wherein determining the price for automobile insurance comprises determining a retroactive adjustment to be applied to a price of an automobile insurance premium for a period during which the telematics data was collected.

13. The system of claim 5, wherein determining the price for automobile insurance comprises determining an adjustment to be prospectively applied to a price of an automobile insurance premium for a future period.

14. The system of claim 5, wherein determining a price for automobile insurance comprises setting a price for a new automobile insurance plan.

15. A method for pricing an insurance premium based on route complexity, the method comprising:
    receiving, by a processor, telematics data collected from a sensor coupled to a vehicle throughout a duration of at least one trip taken by the vehicle while driven by a driver, wherein the telematics data includes at least one of geo-position information of the vehicle and vehicle kinematics data;
    computing, by the processor, a complexity score of the at least one trip based or at least a fractal dimension of a two dimensional representation of the route traversed by the vehicle during the at least one trip derived from the telematics data; and
    determining, by the processor, a price for automobile insurance for the driver based on the complexity score of the at least one trip.

16. The method of claim 15, wherein the complexity score of a trip is based on changes in orientation of the vehicle.

17. The method of claim 15, wherein the complexity score of a trip is based on at least one of speed, acceleration, and jerk of the vehicle.

18. The method of claim 15, further comprising determining, by the processor, an overall complexity rating for a driver based on complexity scores calculated for a plurality of trips taken by the driver.

19. The method of claim 18, further comprising determining, by the processor, a number of trips to be included in the overall complexity rating by analyzing a variation in the complexity scores over time.

20. The method of claim 15, further comprising determining, by the processor, a trip safety score based on a complexity score and a maximum speed for the trip.

21. The method of claim 15, further comprising identifying safety events which occurred during the trip and determining, by the processor, a severity estimation of the safety events.

22. The method of claim 15, wherein determining the price for automobile insurance comprises determining a retroactive adjustment to be applied to a price of an automobile insurance premium for a period during which the telematics data was collected.

23. The method of claim 15, wherein determining the price for automobile insurance comprises determining an adjustment to be prospectively applied to a price of an automobile insurance premium for a future period.

24. The method of claim 15, wherein determining a price for automobile insurance comprises setting a price for a new automobile insurance plan.

25. A non-transitory computer readable medium having stored therein instructions for, upon execution, causing a computer to implement method for pricing an insurance premium based on route complexity, the method comprising:
    receiving, by a processor, telematics data collected from a sensor coupled to a vehicle throughout a duration of at least one trip taken by the vehicle while driven by a driver, wherein the telematics data includes at least one of geo-position information of the vehicle and vehicle kinematics data;
    computing, by the processor, a complexity score of the at least one trip based on at least a fractal dimension of a two dimensional representation of a route traversed by the vehicle during the at least one trip derived from the telematics data; and
    determining, by the processor, a price for automobile insurance for the driver based on the complexity score of the at least one trip.

26. The non-transitory computer readable medium of claim 25, wherein determining the price for automobile insurance comprises determining a retroactive adjustment to be applied to a price of an automobile insurance premium for a period during which the telematics data was collected.

27. The non-transitory computer readable medium of claim 25, wherein determining the price for automobile insurance comprises determining an adjustment to be prospectively applied to a price of an automobile insurance premium for a future period.

28. A system for pricing an insurance premium based on route complexity, the system comprising:
    a computer memory for storing information related to an automobile insurance policy; and
    a processor in communication with the memory, wherein the processor is configured for:
        receiving a fractal complexity score of at least one trip taken by a vehicle while driven by a driver, wherein the fractal complexity score is based on at least a fractal dimension of a two dimensional representation of a route traversed by the vehicle during the at least one trip derived from telematics data received from a sensor within the vehicle, the telematics data comprising at least one of geo-position information of the vehicle and vehicle kinematics data;
        determining a price for automobile insurance for the driver based on the fractal complexity score of the at least one trip; and
        storing the price for the automobile insurance in the computer memory.

* * * * *